United States Patent Office 3,424,699
Patented Jan. 28, 1969

3,424,699
HARDENABLE COMPOSITIONS OF 1,2-POLYEPOXIDES AND METAL CHELATE COMPOUNDS
Bernard Peter Stark, Cambridge, and Michael Edward Benet Jones, Chester, England, assignors to Ciba Limited, Basel, Switzerland, a company, of Switzerland
No Drawing. Continuation-in-part of application Ser. No. 227,703, Oct. 2, 1962. This application July 5, 1966, Ser. No. 562,464
Claims priority, application Great Britain, Oct. 5, 1961, 35,883/61
U.S. Cl. 260—2          10 Claims
Int. Cl. C08g 30/10

ABSTRACT OF THE DISCLOSURE

Hardenable compositions comprising at least one epoxide compound containing one or more 1,2-epoxide groups and at least one chelate compound in which the coordinating atom is bound by one or more of its valencies to a halogen atom and by one or more of its valencies to an oxygen or sulphur atom.

---

This application is a continuation-in-part of our application, Ser. No. 227,703, filed Oct. 2, 1962, now abandoned.

This invention relates to hardenable epoxy resin compositions and to processes for the hardening of such compositions.

According to one aspect of the present invention there are provided hardenable compositions comprising at least one epoxide compound containing one or more 1,2-epoxide groups and at least one chelate compound in which the coordinating atom is bound by one or more of its valencies to a fluorine, chlorine or bromine atom, and by one or more of its valencies to an oxygen or sulphur atom.

According to a preferred embodiment of the invention, the chelates of the present invention conform to the general Formula I:

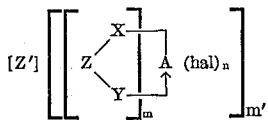

I wherein A represents a coordinating atom, hal represents a fluorine, chlorine or bromine atom, X represents oxygen or sulphur, Y represents oxygen or sulphur doubly bonded to Z, or nitrogen, the remaining valencies of the nitrogen atom, if a nitrogen atom be present, being satisfied either by a divalent atom or group, such as an alkylene group, or by two monovalent atoms or groups such as hydrogen atoms, hydrocarbyl groups or acyl groups, or, as to one valency, by linkage to one such monovalent atom or group, and, as to the remaining valency, by forming part of a double bond joined to an atom present in Z, Z represents an organic group linking the atoms X and Y such that the number of consecutive atoms linking X and Y is not less than 2 nor more than 4, $m$ represents 1, 2 or 3, $n$ is 1 to 4, and Z' is hydrogen or an organic or metal-containing organic group of valency $m'$, where $m'$ is 1 or 2.

The coordinating atom A may be, for example, boron, in which case hal is preferably fluorine, or aluminium, zinc, cadmium, ferric iron, stannic tin, zirconium, vanadium, titanium, antimony, gallium or indium in which case hal is preferably chlorine. A is preferably boron or aluminium.

The chelate compounds are preferably those which are stable at room temperature but which, when heated at 80° to 200° C. in the presence of an epoxide compound containing at least one 1,2-epoxy group, decompose to cause hardening of the epoxide compound.

An especially preferred class of chelate compounds useful in the compositions of the present invention conforms to the General Formula II:

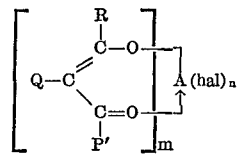

II wherein A represents a coordinating atom, hal represents fluorine, chlorine or bromine, P', Q and R represent hydrogen or halogen or monovalent organic residues with the provision that any two of P', Q and R may together represent a single divalent organic residue, and one of P', Q and R may be a divalent residue joining two residues of the general formula given above omitting one of P', Q and R, $n$ is an integer from 1 to 4, and $m$ is 1, 2 or 3, the value of $2m+n$ being the coordination number of the atom A. In Formula II, P', Q and R may, for example, represent aliphatic, cycloaliphatic, araliphatic, or aromatic hydrocarbon residues, alkyl or alkoxy groups, acyloxy groups, or alkylamino or acylamino groups. Preferably P' represents hydrogen, alkyl of 1 to 6 carbon atoms, phenyl, acyloxyphenyl, halophenyl, phenylamino, or halophenylamino, or a phenylene-bisamino radical joined to two radicals of the formula:

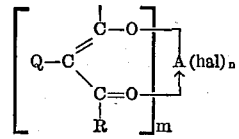

Q represents hydrogen or an alkyl, alkenyl, or alkoxycarbonyl radical of 1 to 6 carbon atoms, or an aralkyl radical, and R represents hydrogen or an alkyl radical of 1 to 6 carbon atoms or a phenyl radical, or any two of P', Q and R together represent a tri- or tetra-methylene radical and P', Q or R (as the case may be) is as first defined.

The most preferred compounds of Formula II are those in which P' is methyl or ethyl, Q is hydrogen, and R is a monofunctional group, e.g. an alkyl group of 1 to 6 carbon atoms, a phenyl or arylamino group.

Another especially preferred class of chelate compounds useful in the compositions of the present invention conforms to the General Formula III:

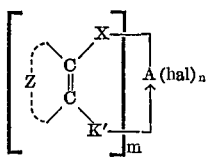

III wherein A represents a coordinating atom, hal represents chlorine, fluorine or bromine, X represents oxygen or sulphur, Z with the two adjacent carbon atoms represents an aromatic nucleus which may be substituted and may be joined to a second

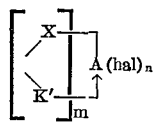

unit via a second pair of vicinal carbon atoms, K' represents an organic radical containing an oxygen, sulphur, or nitrogen atom coordinated to atom A and joined, either directly or via a single other atom, to the indicated carbon atom of the aromatic nucleus, n is an integer from 1 to 4 and n is 1, 2 or 3, the value of $2m+n$ being the coordination number of the atom A. Z with the two adjacent carbon atoms preferably represents a benzene or naphthalene residue and K' is preferably an acyl or alkoxy-carbonyl radical of 1 to 6 carbons, a nitroso or nitro group, a carboxylic acid group, an acylamino group of 1 to 6 carbons, an aracylamino group, or an —$CR^1:NR^2$ group (where $R^1$ is hydrogen or an alkyl group of 1 to 6 carbons and $R^2$ is an aryl group).

The most preferred compounds of Formula III are those in which X is oxygen, Z with the two adjacent carbon atoms represents a benzene residue, and K' is acetyl, methoxycarbonyl, or nitro.

Examples of preferred compounds within the class of General Formula III are those of the structures:

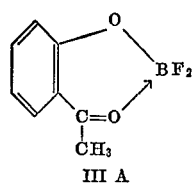
III A

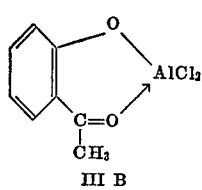
III B

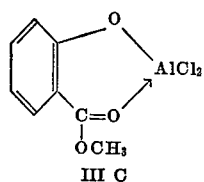
III C

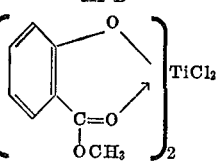
III D

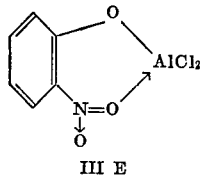
III E

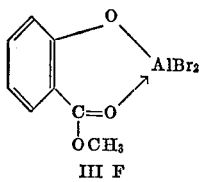
III F

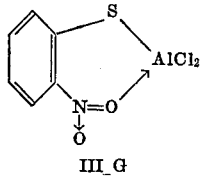
III G

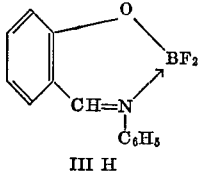
III H

Chelates containing more than one coordinating atom, such as the complex formed by the reaction between nickel dimethylglyoxime and boron trifluoride, and those formed between 2 molecules of a halide containing the coordinating atom and one molecule of an ortho, ortho'-disubstituted methylene-bisphenol in which the two ortho-substituents may be the same or different and have the same meanings as are asigned above to K' in Formula III, may also be used in the hardenable compositions of the invention.

The chelate compounds of General Formula I may be regarded as being formed by the elimination of hydrogen halide from a halide of the coordinating atom and a chelating substance. Examples of chelate-forming substances are phenols substituted in the ortho-position by a group K' where K' is as hereinbefore defined and diketones, especially β-diketones. Suitable ortho-substituted phenols include o-hydroxy-acetophenone, o-nitrophenol, 2,4-dinitrophenol, 1-nitroso-2-naphthol, o-nitrothiophenol, o-hydroxyacetanilide, salicyclic acid, salicyclic aldehyde, and methyl salicylate. Suitable β-diketones include benzoylacetone, p-acetoxybenzoylacetone, acetylacetone, dibenzoylmethane, hexane-2,4-dione, heptane-2,4-dione, dipropionylmethane, dicapropylmethane, 2-acetylcyclohexanone, and 3-alkyl- or 3-alkenyl-pentan-2,4-diones, such as 3-allyl-pentan-2,3-dione.

The chelates of the present invention may be prepared from a halide of the coordinating atom and either a chelate-forming compound, or two or more reactants which together yield the desired chelate-forming compound. Thus, the complex of Formula IV:

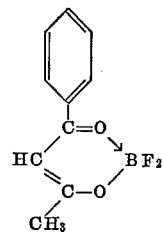

IV may be prepared by the reaction, in an inert solvent, of boron trifluoride with either benzoylacetone, or a mixture of acetophenone and acetic anhydride.

The hardenable compositions of the invention may optionally contain an additional hardener, e.g. a carboxylic acid anhydride, for the epoxy resin.

A major advantage of some of the compositions of the invention is that, while they are relatively stable at low temperatures, they may be very rapidly hardened by heating, e.g. to 100° C. or above, for a short time. The reason for this important property, while not certain, may be that, while certain of the compounds of Formula I are stable at low and moderate temperatures, they partially or completely dissociate when heated to give products which are highly efficient hardeners and accelerators for the hardening of epoxy resins. At low temperatures such compounds of Formula I are themselves substantially inactive as accelerators or hardeners for epoxy resins. Whatever the reason for their particular properties, compositions containing such compounds may be stored for comparatively long periods of time after their preparation without becoming cross-linked to a significant extent, but on heating to a suitable temperature very rapidly become hardened to give resins having valuable technical properties. Chelates which exhibit this latent behavior are, for example, Compounds III B, III C, III F and III H and those represented by the formulae:

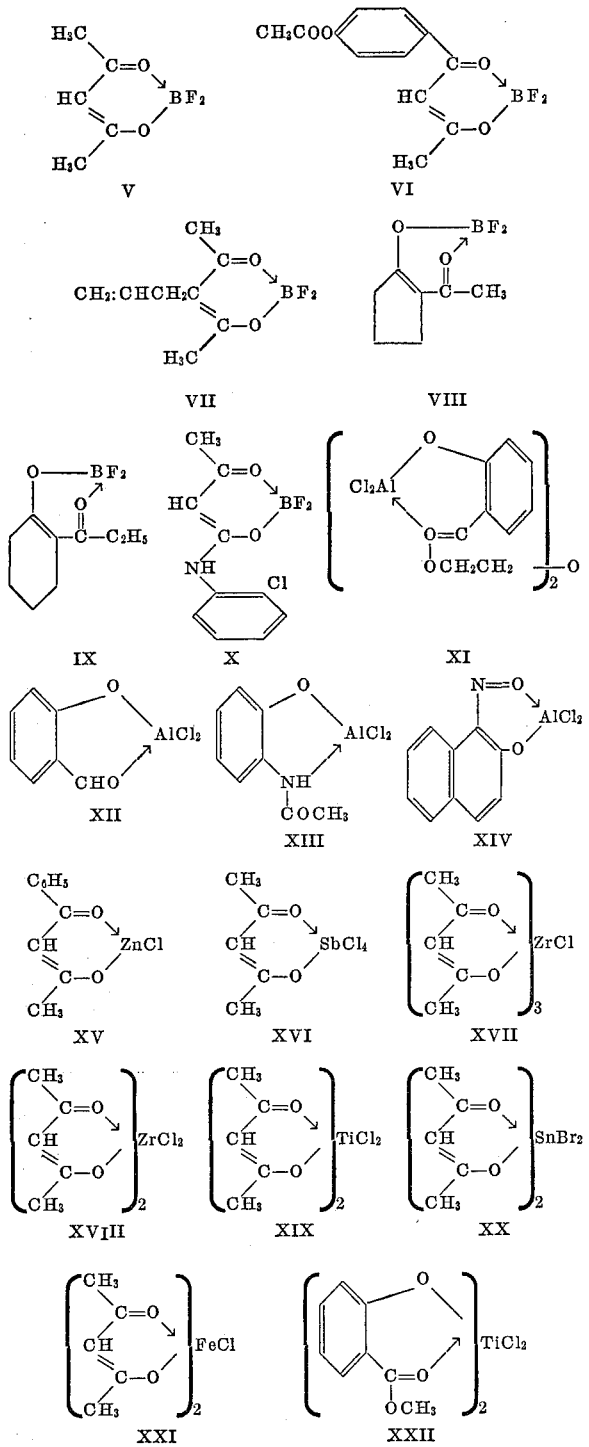

Other chelates have the valuable property of hardening epoxy resins without the external application of heat. According to the structure of the chelate used, hardening may occur either very rapidly or within a longer period, such as 20 minutes to 12 hours. Chelates of this kind usually have the advantage over known Lewis-acid type hardeners for epoxy resins in that they are more convenient to handle; in particular, they are less water-sensitive and fume less when exposed to moist atmospheres. Such chelates include, for example, Compound III A and those represented by the formulae:

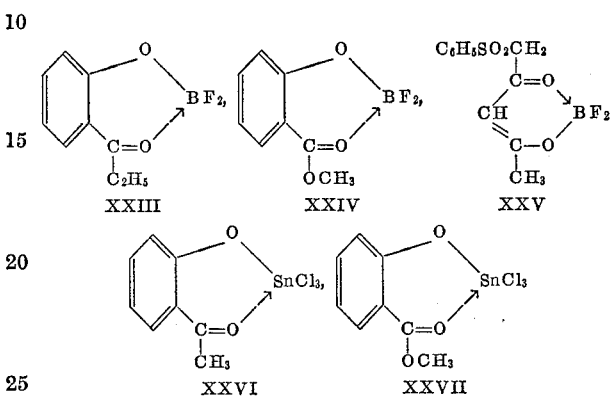

The invention includes within its scope a process for the hardening of epoxy resins which comprises heating a hardenable composition of the invention with or without a second hardener. The invention further comprises cured products obtained by this process.

The chelates may be present in the compositions of the present invention in an amount of 0.01 to 20% by weight of the epoxy resin, and in making the compositions they may, if desired, be dissolved in either the resin, or in an additional hardener for the resin (if such a hardener is to be present in the final composition), or in a previously prepared mixture of epoxy resin and hardener. Alternatively, they may first be dissolved in a solvent, e.g. butyrolactone or a trialkyl phosphate, before admixture with the epoxy resin and (when present) the additional hardener.

The epoxy resins which may be used in the compositions of this invention include, for example, mono- and polyglycidyl ethers of mono- and poly-alcohols such as butyl alcohol, butane-1,4-diol, or glycerol, or of mono- and poly-phenols such as resorcinol, pyrocatechol, hydroquinone, 1,4- and 1,5-dihydroxynaphthalenes, bis(4-hydroxyphenyl)-methane, bis(4-hydroxyphenyl)methylphenylmethane, bis(4-hydroxyphenyl)-tolylmethanes, 4,4'-dihydroxy-diphenyl, bis(4-hydroxyphenyl) sulphone and 2,2-bis(4-hydroxyphenyl)propane; condensation products of aldehydes with phenols (Novolaks); polyglycidyl esters of polycarboxylic acids such as phthalic acid; aminopolyepoxides such as are, for example, obtained by the deyhdrohalogenation of the reaction products of epihalohydrins and primary or secondary amines such as n-butylamine, aniline or bis-(4-methylaminophenyl)methane; and the products which are obtained by the complete or incomplete epoxidation of ethylenically-unsaturated cyclic or acylic olefines and polyolefines. For most purposes it is advantageous to have present in the compositions of the invention at least one bis- or poly-epoxide.

The conventional hardeners which may be, if desired, additionally included in the compositions of the invention include amines and amides, e.g. aliphatic and aromatic primary, secondary and tertiary amines, such as mono-, di- and tri-butylamine, p-phenylenediamine, bis (p-aminophenyl)methane, ethylenediamine, diethylenetriamine, tetra-(hydroxyethyl)diethylenetriamine, triethylenetetramine, tetraethylene-pentamine, trimethylamine, diethylamine, triethanolamine, Mannich bases, piperidine, guanidine and guanidine derivatives, such as phenylguanidine and diphenylguanidine, dicyandiamide, aniline-formaldehyde resins, urea-formaldehyde resins, melamine-formaldehyde resins, polymers of aminostyrenes, and polyamides, e.g. those which are obtained from aliphatic polyamines and di- or tri-merised unsaturated fatty acids; isocyanates; isothiocyanates; polyhydric phenols, such as resorcinol, hydroquinone and bis(4-hydroxyphenyl)dimethylmethane; p-benzoquinone; phenol-aldehyde resins and oil-modified phenol-aldehyde resins; reaction products of aluminium alkoxides or phenolates with tautomerically-reacting compounds of the acetoacetic ester type; and phosphoric acid. The preferred additional hardeners are polycarboxylic acids and their anhydrides, such for example as phthalic anhydride, methylendomethylenetetrahydrophthalic anhydride, dodecenylsuccinic anhydride, hexahydrophthalic anhydride, hexachloroendomethylenetetrahydrophthalic anhydride and endomethylenetetrahydrophthalic anhydride and their mixtures, and maleic and succinic anhydrides.

The compositions of this invention may also contain fillers, plasticisers or colouring agents, for example, asphalt, bitumen, glass fibres, mica, quartz powder, cellulose, kaolin, kieselguhr, finely-divided silica such as that available under the registered tradename "Aerosil," or metal powder.

The compositions may be used in the filled or unfilled state, e.g. in the form of solutions or emulsions, as textile auxiliaries, laminating resins, varnishes, lacquers, dipping resins, casting resins, moulding compositions, and encapsulating, coating, filling and packing materials, adhesives and the like, as well as for the preparation of such materials.

In the examples, the chelate compounds (Complexes I to LIII) and epoxide resins (Epoxides A to X) used were as follows:

Complex I, having the structure shown in Formula VI above, was prepared as follows:

A mixture of p-acetoxyacetophenone (23.4 g.) and acetic anhydride (27.2 g.) was saturated with boron trifluoride at room temperature. The mixture was stirred for 1 hour and then poured into water (300 ml.). After a further 30 min. the mixture was filtered and the solid thus obtained was washed with methanol (50 ml.), and recrystallised from benzene, to yield "Complex I," having M.P. 144–145° C. The yield was 18.1 g.

Complex II, having the structure shown in Formula V above, was prepared as follows:

Boron trifluoride etherate (142 g.) was dissolved in dry toluene (300 ml.) and the mixture was stirred and heated until slow distillation commenced. Dry acetylacetone (100 g.) was added dropwise during 30 minutes, and the distillation was continued until no further hydrogen fluoride was evolved. The residual solution was washed twice with water, and then dried. Finally, the solvent was removed by warming gently in vacuo, and the residual material was distilled; "Complex II" (138 g.) was obtained as the fraction having B.P. 138–142° C. at 0.5 mm. pressure.

Complex III, having the structure shown in Formula IV above, was prepared by reacting boron trifluoride diethyl etherate (71 g.) with benzoylacetone (81.1 g.) in the presence of toluene, substantially as described for Complex II. The complex was obtained as a pale yellow solid (yield, 94.6 g.), having M.P. 156–158° C.

Complex IV, having the structure:

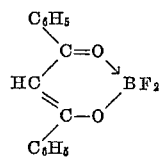

XXVIII was prepared by reacting dibenzoylmethane (17.92 g.) with boron trifluoride diethyl etherate (11.36 g.) in the presence of toluene, substantially as described for Complex II. "Complex IV" was obtained, in a yield of 16.5 g., as a yellow solid having a melting point of 188–189° C.

Complex V, having the structure shown in Formula VII above, was prepared by reacting 3-allyl-pentane-2,4-dione (40 g.) with boron trifluoride diethyl etherate (40.6 g.) in toluene solution, substantially as described for Complex II. The complex was obtained as a dark liquid (29 g.), having a boiling point of 120–130°/1–1.5 mm.

Complex VI, was prepared by reacting 3-methylpentane-2,4-dione (10 g.) with boron trifluoride diethyl etherate (12.5 g.) in toluene solution, substantially as described for Complex II. "Complex VI" was obtained as an off-white solid, M.P. ca. 80° C.

Complex VII, was prepared by reacting 2-acetylcyclohexanone (25.9 g.) with boron trifluoride diethyl etherate (26 g.) in toluene solution, substantially as described for Complex II. "Complex VII" was obtained as a light brown solid, M.P. 65° C., in a yield of 22.6 g.

Complex VIII, was prepared by treatment of acetoacetanilide (10 g.) with boron trifluoride diethyl etherate (40 ml.) as described in J. Amer. Chem. Soc., 1948, 70, 1971, the complex being obtained as a white solid, M.P. 152–154° C.

Complex IX, was prepared as a grey powder, M.P. 64–65° C., by reaction of boron trifluoride etherate with ω-propionylacetophenone, substantially as described for Complex II.

Complex X, was prepared as a white crystalline solid, M.P. 107° C., by reaction of 3-benzylpentan-2,4-dione with boron trifluoride etherate, substantially as described for Complex II.

Complex XI, was prepared as a mobile brown liquid by reaction of 2-methylnonan-4,6-dione with boron trifluoride etherate, substantially as described for Complex II.

Complex XII, was prepared by reacting 3-(2-carbomethoxyethyl)-pentan-2,4-dione with boron fluoride etherate, essentially as described for Complex II.

Complex XIII, having the structure shown in Formula VIII, was prepared by the action of boron trifluoride on a mixture of cyclopentanone and acetic anhydride, essentially as described for Complex II. It is a solid, M.P. 63° C.

Complex XIV, having the structure shown in Formula IX, was prepared by reaction of 2-propionylcyclohexanone with boron trifluoride essentially as described for Complex II. It is a liquid, B.P. 146°/0.2 mm.

Complex XV, having the structure shown in Formula X, was prepared by the addition of boron trifluoride diethyl etherate (40 ml.) to o-chloroacetoacetanilide (20 g.). The mixture first became clear, then solid separated; after being shaken for 2 hours, the mixture was poured into a 5% aqueous solution of sodium carbonate. The white solid which separated was filtered off, washed with water, and recrystallised from chloroform. The product (10.3 g.) was a white solid, M.P. 176.5° C.; having the following elementary analysis: Found, C, 46.57; H, 3.77%. Calc. for $C_{10}H_9ClO_2NBF_2$, C, 46.28; H, 3.50%.

Complex XVI, was prepared by addition of boron trifluoride etherate (40 ml.) to a suspension of 2,5-dichloroaceto-acetanilide (20 g.) in ether (10 g.). The mixture was worked up essentially as described for Complex XV; on recrystallisation of the solid product from a mixture of chloroform and light petroleum (B.P. 60–80°), "Complex XVI" was obtained as a white solid (13.3 g.), having the following elementary analysis: Found, C, 40.86; H, 2.79%. Calc. for $C_{10}H_8Cl_2O_2NBF_2$, C, 40.86; H, 2.74%.

Complex XVII, was prepared as a white solid, M.P. 64–65° C., by reaction of boron trifluoride with ω-butyrylacetophenone in toluene solution; it had the following elementary analysis: Found, C, 60.1; H, 5.6%. Calc. for $C_{12}H_{13}O_2BF_2$, C, 60.5; H, 5.5%.

Complex XVIII, was prepared as follows. A mixture of propionic anhydride (156 g.) and cyclohexanone (55 g.) was added dropwise at 5° C. during 5 minutes to the solid propionic acid:$BF_3$ complex prepared from 216 g. of the acid. The mixture was stirred for half an hour at 5° C., then for 20 hours at room temperature, and was then stirred for 0.5 hour with an aqueous solution of 320 g. of sodium acetate. The mixture was then extracted with light petroleum, the organic solution washed with aqueous sodium bicarbonate solution and then with water, and finally dried over anhydrous sodium sulphate. The dried solution was filtered, the solvent was evaporated from the filtrate, and the residue fractionally distilled in vacuo. The fraction having B.P. 110–115° C./0.7 mm. (44 g.) crystallised, and was recrystallised from methanol to give a solid, M.P. 58° C., having the following elementary analysis: Found, C, 69.27; H, 8.90%. Calc. for $C_{12}H_{18}O_3$, C, 68.63; H, 8.54%.

Boron trifluoride gas was passed into 10 g. of this material until no more was absorbed. The reaction mixture was then taken up in ether, and the ethereal solution was washed with water and then dried. Evaporation of solvent gave 11.8 g. of the liquid chelate compound.

Complex XIX, having the structure shown in Formula XXV above, was prepared as described in J. Org. Chem., 1962, 27, 1253 by reaction of boron trifluoride with a mixture of benzenesulphonylacetone, acetic acid and acetic anhydride; it was a solid, M.P. 133–135° C., having the following elementary analysis: Found, C, 45.47; H, 3.89; S, 11.45%. Calc. for $C_{11}H_{11}SO_4BF_2$, C, 45.60; H, 3.87; S, 11.21%.

Complex XX, having the structure shown in Formula III A, was prepared by reaction of boron trifluoride diethyl etherate (50 g.) with o-hydroxyacetophene (49 g.) in the presence of toluene (125 ml.), substantially as described for Complex II. On evaporation of the mixture to low bulk, the yellow solid chelate compound separated on cooling; the yield was 56 g.

Complex XXI, was prepared by reaction of o-hydroxypropiophenone (50 g.) with boron trifluoride diethyl etherate (47.3 g.) in toluene solutions, essentially as described for Complex XX. The product was obtained as a yellow solid, M.P. 107° C.

Complex XXII, 2,4-pentanedionoaluminum dichloride, was prepared as described in J. Amer. Chem. Soc. 1959, 81, 4213.

Complex XXIII, was prepared by refluxing a mixture of 3-benzyl-pentan-2,4-dione (1 mole) with aluminum chloride (1 mole) in benzene until no more hydrogen chloride was evolved. Removal of solvent by distillation yielded the chelate compound as a solid residue.

Complex XXIV, was prepared by reaction of ω-propionylacetophenone with aluminum chloride, substantially as described for Complex XXIII.

Complex XXV, was prepared by reaction of equimolar amounts of anhydrous aluminum trichloride and 2-acetylcyclopentanone, under conditions similar to those described for Complex XXIII.

Complex XXVI, was prepared by reaction of ω-butyrylacetophenone (1 mole) with aluminium trichloride (1 mole), substantially as described for Complex XXIII.

Complex XXVII, was prepared by refluxing a mixture of anhydrous aluminium chloride (13.3 g.) with 3-(2-carbomethoxyethyl)pentan-2,4-dione (13.3 g.) in benzene (100 ml.) until no further hydrogen chloride was evolved, and then evaporating the mixture to dryness.

Complex XXVIII, was prepared as follows. Anhydrous aluminium trichloride (200 g.) was suspended in benzene (1,500 ml.), and treated with o-hydroxyacetophenone (204 g.), and the mixture was refluxed until no more hydrogen chloride was evolved. The solvent was removed by distillation, to yield the chelate compound (340 g.) as a yellow solid, M.P. above 350° C.

Complex XXIX, was prepared by reaction of methyl salicylate with aluminium chloride, essentially as described for Complex XXIII.

Complex XXX, was prepared by refluxing a mixture of anhydrous aluminium tribromide (26.6 g.), methyl salicylate (15.2 g.) and benzene (100 ml.) until evolution of hydrogen bromide ceased. The mixture was filtered, and the solid product (24.9 g.) dried.

Complex XXXI, having the structural formula shown in FIGURE XI, was prepared as follows: Diethylene glycol disalicylate (0.135 mole) was mixed with aluminium chloride (0.27 mole) and benzene (300 ml.). The mixture was refluxed until hydrogen chloride evolution ceased and then evaporated to dryness.

Complex XXXII, having the structural formula shown in FIGURE XII, was prepared by reacting salicylaldehyde (12.2 g.) with aluminium chloride (13.3 g.) in benzene, essentially as described for Complex XXIII. The product was a yellow-brown paste.

Complex XXXIII, having the structural formula shown in FIGURE III H, was prepared as follows. Aniline (1 mole) was reacted with salicylaldehyde (1 mole) to yield the anil. This anil (9.35 g.) was treated with boron trifluoride diethyl etherate (20 ml.) in the presence of ether (200 ml.). The primrose-coloured precipitate which separated was recrystallised from methyl isobutyl ketone to yield orange crystals of the chelate compound (M.P. 255–257° C.), having the following elementary analysis: Found, C, 63.78; H, 4.06%. Calc. for $C_{13}H_{10}NOBF_2$, C, 63.71; H, 4.11%.

Complex XXXIV, having the structural formula shown in FIGURE III E, was prepared by heating o-nitrophenol (69.4 g.) with anhydrous aluminum trichloride (66.6 g.), in the presence of nitrobenzene (323 ml.) at 100° C., until evolution of hydrogen chloride ceased. On removal of solvent by heating at 0.25 mm. Hg pressure, the chelate compound was left as a brittle brown-red solid (122 g., M.P. 93–97° C.).

Complex XXXV, having the structural formula shown in FIGURE XIII, was prepared by reacting o-hydroxyacetanilide (17.2 g.) with aluminium trichloride (15.2 g.), in the presence of nitrobenzene (250 ml.), at 100° C. After evolution of hydrogen chloride had ceased, the solvent was distilled off to leave the chelate compound as a grey-brown solid (33 g., M.P.>250° C.).

Complex XXXVI, having the structural formula shown in FIGURE XIV, was prepared in the following manner. A solution of 1-nitroso-2-naphthol (17.3 g.) in nitrobenzene (70 ml.) was added to a stirred solution of aluminium trichloride (13.3 g.) in nitrobenzene (45 ml.), at 35° C. When the evolution of hydrogen chloride finally slackened, the mixture was heated to 100° C. until hydrogen chloride evolution ceased. Removal of solvent gave the chelate compound as a black solid (30 g., M.P.>300° C.).

Complex XXXVII, was prepared by reaction of 2,4-dinitrothiophenol (7 g.) with aluminium trichloride (4.65 g.) in nitrobenzene at 100° C. When evolution of hydrogen chloride ceased, the solvent was removed by vacuum distillation to yield the product as a sticky black-brown residue.

Complex XXXVIII, was prepared as an orange solid by reaction of 2,4-dinitrophenol (36.8 g.) with aluminium trichloride (26.6 g.) in nitrobenzene (270 ml.) at 100° C., followed by removal of solvent.

Complex XXXIX, was prepared by reacting bis-dimethylglyoximenickel with boron trifluoride diethyl etherate, as described in Chem. Ber. 1962, 95, 1438.

Complex XL, having the structural formula shown in FIGURE XV, was prepared by heating a mixture of acetophenone (60 g.), zinc chloride (68 g.) and acetic anhydride (204 g.) at 100° C. until the evolution ceased. The mixture was then cooled and filtered, and the solvent evaporated to yield the product as a black solid, M.P. 61° C.

Complex XLI, was prepared by refluxing a mixture of indium trichloride (0.1 mole) and acetylacetone (0.1 mole) in benzene (110 ml.), until evolution of hydrogen chloride ceased. The product was obtained as pink crystals, M.P. 98–108° C.

Complex XLII, was prepared by refluxing a mixture of stannic chloride (26 g.) with o-hydroxyacetophenone (13.6 g.) in benzene (100 ml.), until no more hydrogen chloride was evolved. The product was obtained as a solid on cooling the reaction mixture.

Complex XLIII, was prepared by reaction of stannic chloride with methyl salicylate, as described in Annalen, 1913, 398, 137. It was obtained as a white solid, M.P. 228° C.

Complex XLIV, was prepared by reacting antimony pentachloride with acetylacetone, as described in Ber., 1903, 36, 1833.

Complex XLV, tris(pentan-2,4-diono)zirconium chloride, was prepared as described in J. Chem. Soc. (1924), 125, 1258.

Complex XLVI, bis(pentan-2,4-diono)zirconium dichloride, was prepared as described in J. Prakt. Chem. (1927), 115, 7.

Complex XLVII, bis(pentan-2,4-diono)titanium dichloride, was prepared as described in J. Less-Common Metals, (1961), 3, 247.

Complex XLVIII, bis(pentan-2,4-diono)stannic dibromide, was prepared by reaction of stannic bromide with copper bis(acetylacetonnate), as described in J. Chem. Soc., (1924), 125, 382, as a white solid, M.P. 182–186° C.

Complex XLIX, bis(pentan-2,4-diono)ferric chloride, was prepared by reaction of ferric chloride with ferric tris(acetylacetonate), as described in Nesmeyanov, A.N. Izbrannye Trudy, 1959, 2, 683. It was obtained as a red-brown powder, M.P. 190° C.

Complex L, was prepared by reaction of titanium tetrachloride with methyl salicylate, as described in J. Less-Common Metals, (1961), 3, 247.

Complex LI, was prepared by reacting p-phenylenebis-acetoacetamide (27.6 g.) with boron trifluoride diethyl etherate (56.8 g.) in the presence of ether (200 ml.) and evaporating the mixture.

Complex LII, was prepared by heating equimolar amounts of gallium trichloride and acetylacetone in benzene until evolution of hydrogen chloride ceased. On evaporation of the solvent, a pink solid (M.P. 90–92° C.) was obtained.

Complex LIII, was prepared by reacting vanadium tetrachloride with acetylacetone, as described in Z. Anorg. Chem. (1959), 302, 199.

Epoxide A was prepared in a known way by the reaction of (4,4′-dihydroxydiphenyl)dimethylmethane with epichlorohydrin under alkaline conditions. It has an epoxy value of 5.2 epoxy equivalents per kg.

Epoxide B consisted essentially of the compound of formula

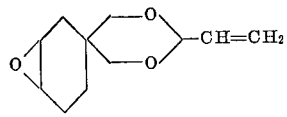

Epoxide C was epichlorohydrin.

Epoxide D was the diglycidyl ester of a dimerised fatty acid of molecular weight ca. 570, and had an epoxy value of 1.77 epoxy equiv./kg., and a chlorohydrin value of 0.91 equiv./kg.

Epoxide E was prepared by treatment of bis(dihydrodicyclopentadienyl)formal with peracetic acid.

Epoxide F was prepared by treatment of dihydrodicyclopentadienyl glycidyl ether with peracetic acid, as described in French Patent No. 1,261,102.

Epoxide G was the diglycidyl ether of a sample of polypropylene glycol having an average molecular weight of 425.

Epoxy H was 6-methyl-3,4-epoxytetrahydrobenzyl 6-methyl-3,4-epoxytetrahydrobenzoate.

Epoxide I was prepared by treatment of dehydronorbonyl tetrahydrobenzoate with peracetic acid, as described in Belgian Patent No. 597,224.

Epoxide J was prepared by treatment of bis(dehydronorbornyl)succinate with peracetic acid, as described in Belgian Patent No. 597,224.

Epoxide K was prepared by treatment of dihydrodicyclopentadienyl oleate with peracetic acid, as described in French Patent No. 1,235,576.

Epoxide L was 4-vinyl-1,2-epoxycyclohexane.

Epoxide M was prepared by treatment of quinitol with epichlorohydrin in the presence of a Lewis acid, followed by alkaline dehydrochlorination of the resulting chlorohydrin.

Epoxide N was prepared by treatment of 4,4′-dihydroxydiphenylsulphone with epichlorohydrin under alkaline conditions.

Epoxide O was the diglycidyl ether of bis(4,4′-dihydroxydicyclohexyl)dimethylmethane.

Epoxide P was N,N-diglycidylaniline.

Epoxide Q was prepared by treatment of bis(dihydrodicyclopentadienyl) ether with peracetic acid.

Epoxide R was prepared by hypochlorination of the bis-(dihydrodicyclopentadienyl)ether of dipropylene glycol, and subsequent dehydrochlorination of the resulting bis-chlorohydrin.

Epoxide S consisted of an epoxidised polybutadiene available commercially under the trade name "Oxiron 2002."

Epoxide T consisting of an epoxidised polybutadiene available commercially under the trade name "Oxiron 2001."

Epoxide U was prepared by treatment of the compound of formula:

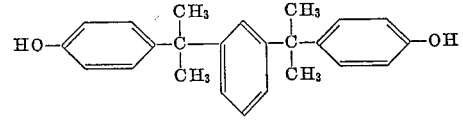

with epichlorohydrin under alkaline conditions.

Polyepoxide V was prepared by treatment of the compound of formula:

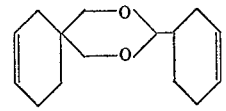

with peracetic acid.

Epoxide W was prepared by transesterification of diethyl succinate with the epoxy-alcohol obtained by hypochlorination of dihydrodicyclopentadienol and dehydrochlorination of the resulting chlorohydrin.

Epoxide X was prepared by treatment of a phenolic Novolak with epichlorohydrin under alkaline conditions. It was a viscous liquid having an epoxy content of 5.82 epoxy equiv./kg., and a chlorohydrin equivalent of 0.06 equiv./kg.

In the examples, the parts stated are by weight. Gel times were determined by means of a "Techne" gelation timer. The Martens Points of the cured specimens were determined according to the D.I.N Specification. Flexural strengths and impact strengths were, except as indicated, determined according to an appropriate V.S.M. Specification. Martens values unqualified by the term "D.I.N." were determined according to a modification of the D.I.N. procedure in which a smaller sample is employed. The results so obtained, although only approximating to those obtained in the D.I.N. procedure, do provide mutually comparable values.

Table I shows the gel times of a variety of compositions within the scope of the invention, and Table II the physical properties of a number of cured epoxy compositions prepared in accordance with the invention. The compositions were prepared by mixing the indicated ingredients at room temperature (except where otherwise indicated). The complex was sometimes dissolved in a solvent (butyrolactone) before mixing with the epoxide. The weight of the samples on which the physical properties were determined may be deduced by assuming that each "part" taken weighed one gram.

TABLE I

| Example No. | Epoxide A parts | Complex | parts | Parts of butyrolactone | Gel time in minutes at— | | | | | | | | | |
|---|---|---|---|---|---|---|---|---|---|---|---|---|---|---|
| | | | | | 20° | 40° | 60° | 80° | 100° | 120° | 140° | 160° | 180° | 200° |
| 1[1] | 10 | | | | | | | | | [2]>2,800 | | | | |
| 2[1] | 10 | I | 0.1 | | | | | | | [3]567 | | | | |
| 3[1] | 10 | I | 0.5 | | >5 days | | | | | [2]307 | | | | |
| 4[1] | 10 | | | | | | | | | | | | | |
| 5[1] | 10 | II | 0.5 | | | | | | >2,800 | >2,800 | >1,000 | | | |
| 6 | 10 | II | 0.5 | | | | | | 478 | 42 | 15 | | | |
| 7 | 100 | III | 0.75 | | >2 days | | | | 79 | 8 | 7 | | | |
| 8 | 100 | III | 1.0 | | | | | | | | 5,962 | | | |
| 9 | 100 | III | 2.0 | | | | | | | 541 | 189 | | | |
| 10 | 100 | III | 5.0 | | | | | | 620 | 160 | 26 | | | |
| 11[3] | 100 | III | 2.0 | | | | | | 70 | 9 | | | | |
| 12[3] | 100 | III | 5.0 | | | | | | 821 | 261 | 66 | | | |
| 13 | 100 | IV | 2.0 | | | | | | 310 | 90 | 18 | | | |
| 14[3] | 100 | IV | 2.0 | | | | | | 689 | 207 | 37 | 12 | | |
| 15[3] | 100 | IV | 5.0 | | | | | | 1,013 | 155 | 137 | 57 | | |
| 16 | 100 | V | 2.0 | | | | | | 474 | 222 | 20 | | | |
| 17 | 100 | V | 5.0 | | | 4,578 | 1,319 | 27 | | | | | | |
| 18[3] | 100 | V | 2.0 | | | 1,867 | 731 | | | | | | | |
| 19[3] | 100 | V | 5.0 | | | 12,046 | 3,446 | 858 | | | | | | |
| 20 | 40 | VI | 0.8 | | | 2,420 | 774 | 342 | | | | | | |
| 21 | 40 | VII | 0.8 | | >4,000 | | | | 1,417 | 255 | 28 | | | |
| 22 | 40 | VIII | 0.8 | 0.8 | | | >2,500 | | 1,411 | 237 | | 20 | | |
| 23 | 40 | IX | 0.8 | | | | | | 620 | 18 | 6 | | | |
| 24 | 40 | X | 0.8 | | | | | | 1,279 | 272 | 37 | 11 | | |
| 25 | 40 | XI | 0.8 | | | | | | 1,163 | 257 | 29 | | | |
| 26 | 40 | XII | 0.8 | | | | | | 314 | 37 | 20 | | | |
| 27 | 40 | XIII | 0.4 | 0.4 | | | | 246 | 76 | 11 | | 14 | | |
| 28 | 40 | XIV | 0.8 | | | | | | 126 | 29 | | | | |
| 29 | 40 | XV | 0.8 | 0.8 | ca. 7,320[4] | | | 652 | 975 | 309 | 33 | | | |
| 30 | 40 | XVI | 0.8 | 0.8 | ca. 7,320[4] | | | 266 | 191 | 21 | | | | |
| 31 | 40 | XVII | 0.8 | | | | | | 49 | 10 | | | | |
| 32 | 40 | XVIII | 0.8 | | | | | | 1,045 | 152 | 26 | | | |
| 33[5] | 40 | XIX | 0.8 | 1.2 | | | | 5,900 | 1,635 | 231 | 42 | | | |
| 34[6] | 40 | XX | 2.0 | 3.0 | | | | | | | | | | |
| 35[7] | 10 | XXI | 0.2 | 0.2 | | | | | | | | | | |
| 36 | 30 | XXII | 1.0 | 2.0 | | | | | 2,348 | 1,655 | 208 | 25 | | |
| 37[8] | 30 | XXII | 1.0 | 2.0 | | | | | | 132 | 48 | 23 | | |
| 38 | 40 | XXIII | 2.0 | 2.0 | | | | | | | 597 | 116 | 48 | |
| 39 | 40 | XXIV | 2.0 | 2.0 | | | | | | | 1,112 | 119 | 64 | 18 |
| 40 | 40 | XXV | 2.0 | 2.0 | | | | | | | 521 | 151 | 32 | |
| 41 | 40 | XXVI | 2.0 | 2.0 | | | | | | | 1,377 | 248 | 67 | |
| 42 | 40 | XXVII | 2.0 | 3.0 | | | | | | >1,200 | 408 | 57 | | |
| 43 | 40 | XXVIII | 0.96 | 1.44 | | | | | | 5,079 | 520 | 131 | 46 | |
| 44 | 40 | XXIX | 0.8 | 1.2 | | | | | | >1,000 | 247 | 77 | 59 | |
| 45 | 40 | XXX | [9]0.84 | 3.76 | | | | | | >1,000 | 3,873 | | 300 | |
| 46 | 40 | XXXI | 2.0 | | >1 day[4] | | | | | | 225 | 24 | | |
| 47 | 40 | XXXII | 2.0 | 2.0 | >2 days | | | | | 608 | | 117 | | |
| 48 | 40 | XXXIII | 0.8 | 0.8 | | | 162 | 17 | | <2 | | | | |
| 49 | 40 | XXXIV | 2.0 | 1.2 | | | 3,159 | 1,034 | 236 | 37 | | | | |
| 50 | 40 | XXV | 2.0 | 1.2 | | | | | 950 | 279 | 69 | 30 | | |
| 51 | 40 | XXVI | 2.0 | 1.2 | | | | | >2,500 | 1,471 | 540 | 119 | 39 | |
| 52 | 40 | XXXVII | 2.0 | 1.2 | | | | | >3,680 | | 631 | 115 | | |
| 53 | 40 | XXXVIII | 2.0 | 2.0 | | | 109 | 44 | 16 | 15 | | | | |
| 54 | 40 | XXXIX | 0.8 | 2.0 | | | | >75 | 3 | | | | | |
| 55 | 40 | XL | 0.6 | 2.2 | | | | | | 2,391 | 352 | 154 | 39 | |
| 56 | 40 | XLI | 0.8 | 3.0 | | | | | | | | 84 | | |
| 57[10] | 40 | XLII | 1.0 | 2.5 | | | | | | | | | | |
| 58[11] | 20 | XLIII | 0.4 | 2.0 | | | | | | | | | | |
| 59 | 40 | XLIV | 2.0 | 1.5 | | | | | 414 | 210 | 138 | 88 | | |
| 60 | 40 | XLV | 2.0 | 2.0 | | | | | >1,200 | | | 114 | 38 | |
| 61 | 40 | XLVI | 2.0 | 2.0 | | | | | >1,200 | | | 104 | 47 | |
| 62 | 40 | XLVII | 2.0 | 7.0 | | | | | | | >1,000 | | 183 | |
| 63 | 40 | XLVIII | 2.0 | 3.0 | >1 day | | | | | | 62 | | | |
| 64 | 40 | XLIX | 2.0 | 3.0 | | | | | | | 245 | 129 | | |
| 65 | 40 | L | 2.0 | | | | | | | | 1,494 | | 339 | |
| 66 | 40 | LI | 0.8 | | | | | | <1 | | | | | |
| 67 | 10 | LII | 0.5 | 1.0 | | | | | | | 40 | | | |
| 68 | 40 | LIII | 2.0 | 4.0 | | | | | | | 992 | | 36 | |

[1] Composition contains 8 parts of methylendomethylenetetrahydrophthalic anhydride.
[2] At 95° C.
[3] Composition contains 80 parts of methylendomethylenetetrahydrophthalic anhydride.
[4] At 25° C.
[5] Mixed at 25° C., the composition gelled in 26 minutes, its maximum temperature being ca. 53° C.
[6] Mixed at 25° C., the composition gelled in less than 5 minutes.
[7] The composition gelled in less than 1 minute.
[8] Composition contains 24 parts of methylendomethylenetetrahydrophthalic anhydride.
[9] Solvent was ethylene glycol.
[10] Mixture gelled rapidly without external heating.
[11] Mixture gelled in ca. 2 minutes without external heating.

TABLE II

| Ex. No. | Epoxide parts | | Complex parts | | Curing conditions | Martens value, °C. | Appearance |
|---|---|---|---|---|---|---|---|
| 69 | A | 100 | II | 2.0 | 100° C. for 4 hours, then 120° C. for 20 hours | 111 (DIN) | Brown casting.[1] |
| 70 | A | 100 | II | 2.0 | 120° C. for 1 hour, then 160° C. for 16 hours | 148 [2] | |
| 71 | A | 100 | III | 2.0 | 120° C. for 24 hours | 83 (DIN) | ([3]). |
| 72 | A | 100 | V | 2.0 | 80° C. for 24 hours, then 120° C. for 24 hours | 125 (DIN) | Pale yellow-brown casting.[4] |
| 73 | 1 | 100 | VII | 2.0 | 120° C. for 24 hours | 59 (DIN) | Pale yelolow-brown casting.[5] |
| 74 | A | 100 | XI | 2.0 | ___do___ | 51 (DIN) | ([6]). |
| 75 | A | 100 | XII | 2.0 | ___do___ | 53 (DIN) | ([7]). |
| 76 [8] | A | 100 | XXII | 4.0 | 120° C. for 1 hour, then 160° C. for 17 hours | | ([9]). |
| 77 | A | 100 | XXVIII | 4.75 | 160° C. for 17 hours | | ([10]). |
| 78 | A | 100 | XL | [11] 2 | 140° C. for 24 hours, then 180° C. for 24 hours | 53 (DIN) | Black casting.[12] |
| 79 | A | 10 | II | 0.2 | 120° C. for 21 hours | 157 | Yellow-brown casting. |
| 80 | {A / B} | 8 / 2 | II | 0.2 | ___do___ | 176 | Do. |
| 81 | {A / B} | 6 / 4 | II | 0.2 | ___do___ | | Black, infusible casting. |
| 82 | {A / B} | 4 / 6 | II | 0.2 | ___do___ | | Brown, flexible casting. |
| 83 | {A / B} | 2 / 8 | II | 0.2 | ___do___ | | Pale brown, brittle casting. |
| 84 | A | 10 | II | 0.2 | 100° C. for 24 hours | | Hard, pale brown casting. |
| 85 | {A / C} | 8 / 2 | II | 0.2 | ___do___ | | Do. |
| 86 | {A / C} | 6 / 4 | II | 0.2 | ___do___ | | Do. |
| 87 | {A / C} | 4 / 6 | II | 0.2 | ___do___ | | Pale brown hard rubbery casting. |
| 88 | {A / C} | 2 / 8 | II | 0.2 | ___do___ | | Do. |
| 89 | D | 10 | II | 0.2 | 120° C. for 21½ hours [13] | | Rubbery casting. |
| 90 | E | 10 | II | 0.5 | 120° C. for 24 hours,[14] then at 180° C. for a further 4 hours | {86 / 176} | Yellow-brown casting. |
| 91 | F | 10 | II | 0.5 | 120° C. for 22 hours [13] | 176 | Chocolate-brown casting. |
| 92 | G | 3 | XI | 0.2 | 120° C. for 24 hours then at 180° C. for a further 4 hours | {62 / 81} | Pale yellow casting. |
| 93 | {A / G} | 9 / 6 | XI | 0.2 | 120° C. for 24 hours | | Pale yellow, flexible, infusible casting. |
| 94 | H | 10 | II | 0.5 | 120° C. for 24 hours [15] | 212 | Clear brown casting. |
| 95 | I | 20 | V | 1.0 | 120° C. for 24 hours [16] then at 180° C. for a further 4 hours | {115 / 138} | Light brown casting. |
| 96 | J | 10 | V | | 120° C. for 24 hours [17] | | Brown, infusible casting. |
| 97 | K | 15 | V | 0.75 | ([16]) | | Very flexible, rubbery material obtained by gelling at 120° C. |
| 98 | {A / L} | 7.5 / 7.5 | II | 0.3 | 120° C. for 2½ hours [17] | | Pale yellow, flexible, infusible casting. |
| 99 | M | 15 | XI | 0.3 | 120° C. to gel point | | Brown, insoluble, infusible casting. |
| 100 | N | 20 | XI | 0.4 | 180° C. to gel point (<5 minutes) [18] | | Hard, grey, infusible casting. |
| 101 | O | 15 | II | 0.3 | 120° C. to gel point (ca. 15 minutes) [17] | | Pale brown, flexible casting. |
| 102 | P | 15 | XI | 0.3 | 120° C. to gel point [17] | | Flexible, infusible casting. |
| 103 | Q | 15 | II | 0.75 | 120° C. for 24 hours | | Brittle, pale yellow, insoluble infusible casting. |
| 104 | R | 10 | II | 0.5 | 100° C. for 2½ hours, [19] then 160° C. for 2 hours, then at 160° C. for a further 2 hours; Or, 120° C. for 45 minutes,[20] then 160° C. for 2 hours | {158 / 182 / 182} | Hard, brown, infusible casting. |
| 105 | S | 15 | II | 0.3 | 120° C. for 24 hours [21] | | Strong, pale yellow, flexible casting. |
| 106 | T | 15 | XI | 0.3 | 120° C. for 24 hours | | Strong, pale brown casting. |
| 107 | U | 15 | II | 0.3 | 120° C. for 24 hours [20] | | Hard, pale yellow, infusible casting. |
| 108 | V | 10 | II | 0.5 | 120° C. for 24 hours [13] | | Yellow-orange casting. |
| 109 | W | 20 | II | 0.6 | 120° C. for 24 hours | 144 | |
| 110 | X | 20 | XI | 0.4 | ___do___ | 63 | Strong, pale yellow casting. |

[1] The casting had a flexural strength of 7.7 kg./mm.² and an impact strength of 5.7 cm.-kg./cm.².

[2] Compositions containing the same amounts of Epoxide and Complex and, in addition, the indicated amount of methylendomethylenetetrahydrophthalic anhydride, when used in the same way, had the following Martens values:

| Parts of anhydride | Martens value, °C. |
|---|---|
| 2.0 | 145 |
| 4.0 | 136 |
| 6.0 | 125 |
| 8.0 | 122 |
| 10.0 | 117 |
| 13.7 | 114 |
| 22.9 | 102 |
| 36.7 | 86 |
| 55.0 | 69 |
| 68.7 | 56 |
| 77.9 | 53 |
| 87.1 | 44 |

[3] The casting had a flexural strength of 8.5 kg./mm.² and an impact strength of 4.2 cm.-kg./cm.².

[4] The casting had a flexural strength of 7.2 kg./mm.² and an impact strength of 3.5 kg./mm.².

[5] The casting had a flexural strength of 13.9 kg./mm.² and an impact strength of 6.6 cm.-kg./cm.².

[6] The casting had a flexural strength of 13.1 kg./mm.² and an impact strength of 4.6 cm.-kg./cm.².

[7] The casting had a flexural strength of 13.5 kg./mm.² and an impact strength of 5.7 cm.-kg./cm.2.

[8] The composition also contained 73.3 parts of methylendomethylenetetrahydrophthalic anhydride.

[9] The casting had a heat distortion temperature (determined according to Z.S.T.M. Specification No. 648-56) of 143° C.

[10] The casting had a heat distortion temperature (A.S.T.M. Specification No. 648-56) of 94° C., a mean flexural strength (A.S.T.M. Specification No. 790-59T) of 950 kg./cm.², and a flexural modulus of 3.65×10⁴ kg./cm.².

[11] In 5 g. of butyrolactone.

[12] The casting had a flexural trength of 13.2 kg./mm.² and an impact strength of 7.6 kg./mm.².

[13] The composition gelled within 5 minutes.

[14] The composition gelled in less than 20 minutes.

[15] The composition remained liquid for more than a day at room temperature but gelled in less than 15 minutes at 120° C.

[16] The composition remained liquid for more than a day at room temperature but gelled in less than 30 minutes at 120° C.

[17] The composition remained liquid for more than a day at room temperature.

[18] The constituents of the composition are mixed in the molten state at 180° C.

[19] The composition gelled in about 45 minutes at 100° C.

[20] The composition gelled within 20 minutes at 120° C.

[21] The composition gelled in less than 1 hour.

EXAMPLE 111

157 parts of a polyglycidyl ether of a phenol novolak resin with an epoxy value of 5.21 equivalents per kgm., a phenol-formaldehyde ratio of 1:0,85 and a softening point of 68° C. were dissolved in 52 parts of ethylene chloride. A solution of 8.25 parts of "Complex II" dissolved in the minimum amount of acetone was added and the resulting homogeneous solution was compounded with 10 parts of glyceryl monostearate, 175 parts of kaolin and 150 parts of 6 mm. glass fibres in a Z-blade mixer. The material was then heated in a vacuum oven at 60° C. to constant weight.

A small tray weighing 35 grams was obtained by moulding at 165° C. for 30 seconds. It was pale grey with an excellent gloss and good rigidity at the moulding temperature.

The following electrical properties were measured:

Vol. resistivity _____ohm. cms__ $2.9 \times 10^{16}$
Vol. resistivity after 24 hrs. in water
 at 20° C. _____ohm. cms__ $3.8 \times 10^{15}$
Surface resistance (Comparison No.) _____ 11
Surface resistance after 24 hrs. in water at 20° C __ 11
Tracking resistance _____ T 3 cedure described in Example 112 in conjunction with "Complex VIII".

| Example No. | 113 | 114 | 115 | 116 | 117 |
|---|---|---|---|---|---|
| Epoxy phenol novolak | 157 | 157 | 157 | 157 | 157 |
| "Complex VIII" | 15.6 | 3.12 | 4.68 | 6.24 | 8.25 |
| Curing cycle at 165° C | (1) | (1) | (2) | (3) | (4) |

[1] Not cured after 5 min.
[2] Partly cured after 4 min.
[3] Cured after 2 min.
[4] Cured after 30 sec.

| Example No. | 118 | 119 | 120 | 121 | 122 | 123 | 124 | 125 | 126 | 127 | 128 | 129 | 130 | 131 | 132 |
|---|---|---|---|---|---|---|---|---|---|---|---|---|---|---|---|
| Epoxy Phenol Novolak | 157 | 157 | 157 | 157 | 157 | 157 | 157 | 157 | 157 | 157 | 157 | 157 | 157 | 157 | 157 |
| "Complex VIII" | 8.25 | 8.25 | 8.25 | 8.25 | 8.25 | 8.25 | 8.25 | 8.25 | 8.25 | 8.25 | 8.25 | 8.25 | 8.25 | | |
| "Complex II" | | | | | | | | | | | | | | 8.25 | |
| "Complex III" | | | | | | | | | | | | | | | 8.25 |
| Diethylamine | | 0.27 | 0.41 | 0.54 | 0.68 | 1.35 | 2.0 | 2.7 | | | | | | 1.02 | 0.72 |
| N-benzyldimethylamine | | | | | | | | | 2.5 | | | | | | |
| Triethylamine | | | | | | | | | | 1.84 | | | | | |
| Pyridine | | | | | | | | | | | 1.44 | | | | |
| Aniline | | | | | | | | | | | | 0.34 | 3.4 | | |
| Curing cycle for 35 gm. tray at 165° C | 1 30 | 1 30 | 1 45 | 1 45 | 2 2 | (3) | (3) | (3) | (4) | 2 3 | (5) | 1 30 | 1 30 | 1 45 | 2 2 |
| Mouldability after 24 hrs. at 60° C | (6) | (6) | (7) | (7) | (7) | (3) | (3) | (3) | | (7) | | (6) | (6) | (6) | (7) |

[1] Seconds.
[2] Minutes.
[3] Partly cured after 5 min.
[4] Not cured after 8 min.
[5] Partly cured after 4 min.
[6] Poor.
[7] Good.

EXAMPLE 112

157 parts of a polyglycidyl ether of a phenol novolak resin which is soft at room temperature and has an epoxy value of 5.5 equivalents per kgm. and a phenol-formaldehyde ratio of 1:0.66 were dissolved in 52 parts of ethylene chloride. A solution of 8.25 parts of "Complex IX" dissolved in the minimum amount of acetone was added and the resulting homogeneous solution was compounded with 2.5 parts of zinc stearate, 175 parts of kaolin and 15 parts of glass fibres. The material was dried to constant weight in a vacuum oven at 60° C.

A small tray weighing 35 gm. was obtained by moulding for 1.5 minutes at 165° C. It was a light brown with a good gloss and had good rigidity at the moulding temperature.

The following electrical properties were measured at 27° C.:

| Example No. | 118 | 120 | 122 | 127 |
|---|---|---|---|---|
| Vol resistivity (ohms. cms) | $2.6 \times 10^{15}$ | $1.8 \times 10^{15}$ | $1.3 \times 10^{15}$ | $1.1 \times 10^{15}$ |
| Vol. resistivity after 24 hrs. in water (ohm. cms.) | $2.6 \times 10^{15}$ | $1.6 \times 10^{15}$ | $1.2 \times 10^{15}$ | $8.2 \times 10^{14}$ |
| Surface resistance (comp. no.) | 12 | 11 | 11 | 11 |
| Surface resistance after 24 hrs. in water at 20° C. (comp. no.) | 11 | 12 | 12 | 12 |
| Tracking resistance | T 3 | T 3 | R 3 | T 3 |

EXAMPLES 133–139

The use of various complexes as catalysts for the cure of the epoxy phenol novolak described in Example 111 with 4:4'-diaminodiphenylsulphone was investigated as illustrated below:

| Example No. | 133 | 134 | 135 | 136 | 137 | 138 | 139 |
|---|---|---|---|---|---|---|---|
| Epoxy phenol novolak | 143.6 | 143.6 | 143.6 | 143.6 | 143.6 | 143.6 | 143.6 |
| Diaminodiphenylsulphone | 46.4 | 46.4 | 46.4 | 46.4 | 46.4 | 46.4 | 46.4 |
| "Complex VIII" | 7.2 | 5.8 | 4.35 | 2.9 | | | |
| "Complex II" | | | | | | 1.9 | |
| "Complex III" | | | | | | | 2.9 |
| Glyceryl Monostearate | 10 | 10 | 10 | 10 | 10 | 10 | 10 |
| Kaolin | 150 | 150 | 150 | 150 | 150 | 150 | 150 |
| Glass fibre | 150 | 150 | 150 | 150 | 150 | 150 | 150 |
| Curing cycle for 35 gm. tray at 165° C | 1 30 | 1 30 | 1 30 | 2 1 | 2 10 | 2 1¼ | 2 1 |
| Mouldability after 24 hrs. at 60° C | (3) | (4) | (5) | (6) | (7) | (6) | |

[1] Seconds.
[2] Minutes.
[3] Poor.
[4] Fair.
[5] Moderate.
[6] Good.
[7] Slow curing.

The following electrical properties were recorded:

Vol. resistivity _____ohm. cms__ $2.3 \times 10^{15}$
Vol. resistivity after 24 hrs. in water ohm. cms. $2.1 \times 10^{15}$
Surface resistance _____ 12
Surface resistance after 24 hrs. in water _____ 10
Tracking resistance _____ T 2

EXAMPLES 113–117

The effect of varying the complex:resin ratio on the curing cycle was investigated using the resin and procedure The following electrical properties were measured:

| Example No. | 138 | 139 |
|---|---|---|
| Vol. resistivity (ohm. cms.) | $1.3 \times 10^{15}$ | $1.4 \times 10^{15}$ |
| Vol. resistivity after 24 hrs. in water (ohm. cms.) | $1.2 \times 10^{15}$ | $1.3 \times 10^{15}$ |
| Surface resistance (Comp. No.) | 10 | 10 |
| Surface resistance after 24 hrs. in water (Comp. No.) | 12 | 12 |
| Tracking resistance | T 2 | T 2 |

Using the resin:hardener:catalyst ratio described in Example 136 with (a) glass fibers (6 mm.) and (b) mineral fillers, the following properties were measured:

|  | a | b |
|---|---|---|
| Total shrinkage, percent | 0.32 | 0.94 |
| Flexural Strength (DIN 53,452), kg./cm.² | 780 | 684 |
| Impact Strength (DIN 53,453), cm. kg./cm.² | 11.8 | 4.3 |
| Notch Impact Strength (DIN 53,453), cm. kg./cm.² | 12.7 | 1.5 |
| Martens Value (DIN 53,458), ° C. | 141 | 102 |
| Change in wt. in water (DIN 53,472), mg. | 17.7 | 14.7 |
| Ignition Loss (VDE 0302/III 43) | 4 | 4 |
| Loss Factor tan δ×10², 50 c.p.s. | 2.46 | 4.06 |
| Dielectric Constant (27° C.) | 5.8 | 6.2 |
| Resistivity (27° C.), ohm. cms. | 1.5×10¹⁵ | 6.5×10¹⁴ |
| Resistivity after 24 hrs. in water (27° C.), ohm. cms. | 7.7×10¹⁴ | 6.9×10¹⁴ |
| Surface Resistance (27° C.), (Comp. No.) | 13 | 13 |
| Surface Resistance after 24 hrs. in water (27° C.), (Comp. No.) | 12 | 12 |
| Breakdown Voltage (Inst. Value), kv./cm. | 177 | 192 |
| Breakdown Voltage (1 Min. Value), kv./cm. | 170 | 171 |
| Arc Resistance | L 1 | L 1 |
| Tracking Strength | T 2 | T 2 |

What is claimed is:

1. A hardenable resin composition consisting essentially of (1) a 1,2-epoxide compound having more than one epoxy group per molecule, and (2) 0.01 to 20% (calculated on the weight of the 1,2-epoxide compound) of a chelate compound selected from the group consisting of (a) a chelate compound of the formula

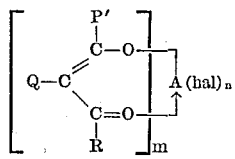

wherein A is a coordinating atom selected from the class consisting of boron, aluminum, titanium, zirconium, tin$^{IV}$, iron$^{III}$, and antimony$^{V}$, "hal" is a halogen atom selected from the class consisting of fluorine, chlorine and bromine, P' is a member selected from the class consisting of alkyl group of 1 to 6 carbon atoms and the phenyl group, Q is a member selected from the class consisting of hydrogen atom, alkyl group of 1 to 6 carbon atoms, alkenyl group, benzyl group and (2-carbomethoxy) alkyl group, R is a member of the class consisting of alkyl group of 1 to 6 carbon atoms, the phenyl group, the acetoxy-phenyl group, the group

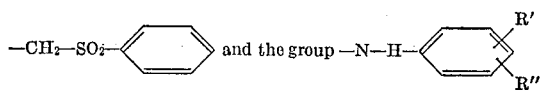

wherein R' and R" each is a member of the class consisting of hydrogen and chlorine, and together Q and R form a member selected from the class consisting of trimethylene group and tetramethylene group, $m$ is an integer of at least 1 and at the most 4, $n$ is an integer of at least 1 and at most 4, the value of $2m+n$ being the coordination number of the atom A, and (b) a chelate compound of the formula

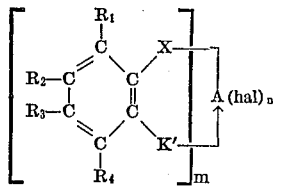

wherein A is a coordinating atom selected from the class consisting of boron, aluminum, titanium, zirconium, tin$^{IV}$, iron $^{III}$, and antimony$^{V}$, "hal" is a halogen atom selected from the class consisting of fluorine, chlorine and bromine, X is a member selected from the class consisting of oxygen and sulfur, K' is a member selected from the class consisting of nitro group, nitroso group, the carboxyl group, the group

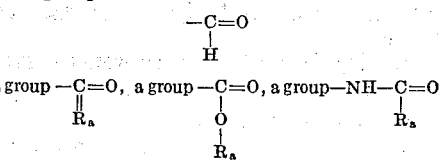

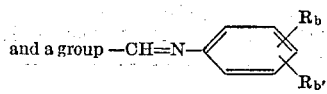

and a group 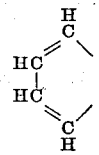

$R_a$ being an alkyl group of at least 1 and at the most 2 carbon atoms, $R_b$ and $R_b'$ each being selected from the class consisting of hydrogen, halogen and alkyl, $R_1$, $R_2$, $R_3$ and $R_4$ each is a member selected from the class consisting of hydrogen, alkyl group and nitro group, and together $R_2$ and $R_3$ form the divalent radical

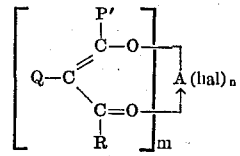

$m$ is an integer of at least 1 and at the most 3, $n$ is an integer of at least 1 and at the most 4, and the value of $2m+n$ being the coordination number of the atom A.

2. A hardenable resin composition as claimed in claim 1 wherein 0.5 to 20% (calculated on the weight of the 1,2-epoxide compound) of a chelate is used.

3. A hardenable resin composition consisting essentially of (1) a 1,2-epoxide compound having more than one epoxy group per molecule, and (2) 0.01 to 20% (calculated on the weight of the 1,2-epoxide compound) of a chelate compound of the formula

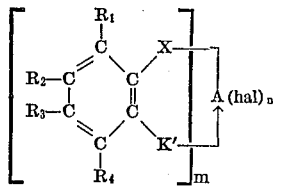

wherein A is a coordinating atom selected from the class consisting of boron, aluminum, titanium, zirconium, tin$^{IV}$, iron$^{III}$ and antimony$^{V}$, "hal" is a halogen atom selected from the class consisting of fluorine, chlorine and bromine, P' is a member selected from the class consisting of alkyl group of 1 to 6 carbon atoms and the phenyl group, Q is a member selected from the class consisting of hydrogen atom, alkyl group of 1 to 6 carbon atoms, alkenyl group, benzyl group and (2-carbomethoxy) alkyl group, R is a member of the class consisting of alkyl group of 1 to 6 carbon atoms, the phenyl group, the acetoxy-phenyl group, the group

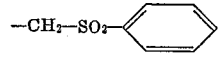

and the group

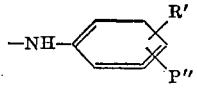

wherein R' and R" each is a member of the class consisting of hydrogen and chlorine, and together Q and R form a member selected from the class consisting of trimethylene group and tetramethylene group, $m$ is an integer of at least 1 and at the most 4, the value of $2m+n$ being the coordination number of the atom A.

4. A hardenable resin composition consisting essentially of (1) a 1,2-epoxide compound having more than one epoxy group per molecule, and (2) 0.01 to 20% (calculated on the weight of the 1,2-epoxide compound of the compound of the formula

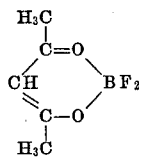

5. A hardenable resin composition as claimed in claim 3, wherein 0.5 to 20% (calculated on the weight of the 1,2-epoxide compound) of a chelate is used.

6. A hardenable resin composition consisting essentially of (1) a 1,2-epoxide compound having more than one epoxy group per molecule, and (2) 0.01 to 20% (calculated on the weight of the 1,2-epoxide compound) of a chelate compound of the formula

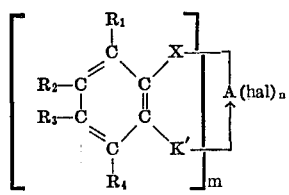

wherein A is a coordinating atom selected from the class consisting of boron, aluminum, titanium, zirconium, $tin^{IV}$, $iron^{III}$, and $animony^V$, "hal" is a halogen atom selected from the class consisting of fluorine, chlorine and bromine, X is a member selected from the class consisting of oxygen and sulfur, K' is a member selected from the class constituting of nitro group, nitroso group, the carboxyl group, the group

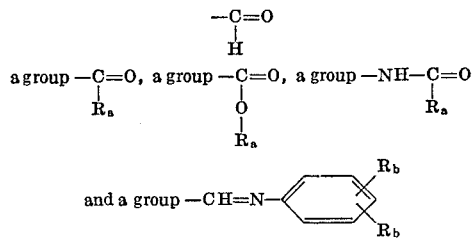

$R_a$ being an alkyl group of at least 1 and at the most 2 carbon atoms, $R_b$ and $R_b'$ each being selected from the class consisting of hydrogen, halogen and alkyl, $R_1$, $R_2$, $R_3$ and $R_4$ each is a member selected from the class consisting of hydrogen, alkyl group and nitro group, and together $R_2$ and $R_3$ form the divalent radical

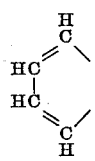

$m$ is an integer of at least 1 and at the most 3, $n$ is an integer of at least 1 and at the most 4, the value of $2m+n$ being the coordination number of the atom A.

7. A hardenable resin composiiton as claimed in claim 6, wherein 0.5 to 20% (calculated on the weight of the 1,2-epoxide compound) of a chelate is used.

8. A heat-hardenable resin composition which is stable at room temperature, consisting essentially of (1) a 1,2-epoxide compound having more than one epoxy group per molecule and (2) 0.01 to 20% (calculated on the weight of the 1,2-epoxide compound) of a chelate compound selected from the group consisting of (a) a chelate compound of the formula

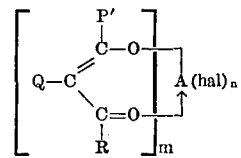

wherein A is a coordinating atom selected from the class consisting of boron, aluminum, titanium, zirconium, $tin^{IV}$, $iron^{III}$, and $antimony^V$, "hal" is a halogen atom selected from the class consisting of fluorine, chlorine and bromine, P' is a member selected from the class consisting of alkyl group of 1 to 6 carbon atoms and the phenyl group, Q is a member selected from the class consisting of hydrogen atom, alkyl group of 1 to 6 carbon atoms, alkenyl group, benzyl group and (2-carbomethoxy) alkyl group, R is a member of the class consisting of alkyl group of 1 to 6 carbon atoms, the phenyl group, the acetoxy-phenyl group, the group

and the group

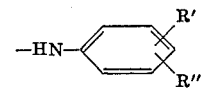

wherein R' and R" each is a member of the class consisting of hydrogen and chlorine, and together Q and R form a member selected from the class consisting of trimethylene group and tetramethylene group, $m$ is an integer of at least 1 and at the most 4, the value of $2m+n$ being the coordination number of the atom A, and (b) a chelate compound of the formula

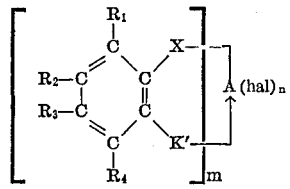

wherein A is a coordinating atom selected from the class consisting of boron, aluminum, titanium, zirconium, $tin^{IV}$, $iron^{III}$, and $antimony^V$, "hal" is a halogen atom selected from the class consisting of fluorine, chlorine and bromine, X is a member selected from the class consisting of oxygen and sulfur, K' is a member selected from the class consisting of nitro group, nitroso group, the carboxyl group, the group

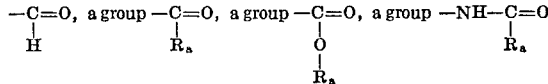

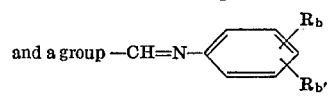

$R_a$ being an alkyl group of at least 1 and at the most 2 carbon atoms, $R_b$ and $R_b'$ each being selected from the class consisting of hydrogen, halogen and alkyl, $R_1$, $R_2$, $R_3$ and $R_4$ each is a member selected from the class consisting of hydrogen, alkyl group and nitro group, and together $R_2$ and $R_3$ form the divalent radical

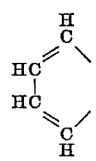

$m$ is an integer of at least 1 and at the most 3, $n$ is an integer of at least 1 and at the most 4, the value of $2m+n$ being the coordination number of the atom A.

9. A heat-hardenable resin composition as claimed in claim 8, wherein 0.5 to 20% (calculated on the weight of the 1,2-epoxide compound) of a chelate is used.

10. A hardenable resin composition consisting essentially of (1) a 1,2-epoxide compound having more than one epoxy group per molecule, and (2) 0.01 to 20% (calculated on the weight of the 1,2-epoxide compound) of the chelate compound of the formula

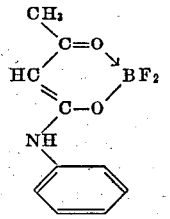

References Cited

UNITED STATES PATENTS 2,876,208  3/1959  Naps _____ 260—47

WILLIAM H. SHORT, *Primary Examiner.*

T. PERTILLA, *Assistant Examiner.*

U.S. Cl. X.R.

260—47, 88.3, 51, 78.4, 79.3, 9, 37, 834; 117—161; 161—184

UNITED STATES PATENT OFFICE
CERTIFICATE OF CORRECTION

Patent No. 3,424,699                                                              January 28, 1969

Bernard Peter Stark et al.

It is certified that error appears in the above identified patent and that said Letters Patent are hereby corrected as shown below:

Column 20, lines 5 to 7, that portion of the formula reading

          should read          

same column 20, line 65, the formula should appear as shown below:

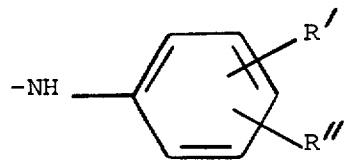

Column 21, line 45, the formula should appear as shown below:

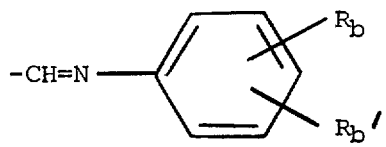

same column 21, line 68, "composiiton" should read -- composition --.

Signed and sealed this 31st day of March 1970.

(SEAL)
Attest:

EDWARD M. FLETCHER, JR.                          WILLIAM E. SCHUYLER, JR.
Attesting Officer                                           Commissioner of Patents